(12) United States Patent
Vasseur et al.

(10) Patent No.: US 7,230,913 B1
(45) Date of Patent: Jun. 12, 2007

(54) MPLS FAST REROUTE WITHOUT FULL MESH TRAFFIC ENGINEERING

(75) Inventors: Jean Philippe Vasseur, Lompret (FR); Robert Goguen, Acton, MA (US); Carol Iturralde, Framingham, MA (US)

(73) Assignee: Cisco Technology, Inc., San Jose, CA (US)

( * ) Notice: Subject to any disclaimer, the term of this patent is extended or adjusted under 35 U.S.C. 154(b) by 1012 days.

(21) Appl. No.: 10/166,886

(22) Filed: Jun. 11, 2002

(51) Int. Cl.
*H04L 12/56* (2006.01)
(52) U.S. Cl. ...................................... 370/216; 370/409
(58) Field of Classification Search ................ 370/216, 370/217, 225, 226, 227, 389, 406, 409, 410
See application file for complete search history.

(56) References Cited

U.S. PATENT DOCUMENTS

| | | | |
|---|---|---|---|
| 5,020,052 A | 5/1991 | Deprycker et al. | 370/60 |
| 2002/0112072 A1* | 8/2002 | Jain | 709/239 |
| 2003/0108029 A1* | 6/2003 | Behzadi | 370/351 |

OTHER PUBLICATIONS

Chen et al. Fault Restoration Techniques for MPLS with QoS Constraints. Aug. 2000. pp. 1-21.*
R. Braden, et al. "Resource ReSerVation Protocol (RSVP)—Version 1 Functional Specification," RFC 2205, Internet Engineering Task Force, Sep. 1997.
D. Awduche, et al. "Requirements for Traffic Engineering Over MPLS," RFC 2702, Internet Engineering Task Force, Sep. 1999.
E. Rosen, et al. "Multiprotocol Label Switching Architecture," RFC 3031, Internet Engineering Task Force, Jan. 2001.
D. Gan, et al. "A Method for MPLS LSP Fast-Reroute Using RSVP Detours," Internet Draft, Internet Engineering Task Force, Apr. 2001.
J. P. Lang, et al. Generalized MPLS Recovery Mechanisms, Internet Draft, Internet Engineering Task Force, Jun. 2001.
P. Ashwood-Smith, et al. Generalized MPLS Signaling—RSVP-TE Extensions, Internet Draft, Internet Engineering Task Force, Oct. 2001.
Pan, et al. "Fast Reroute Techniques in RSVP-TE," Internet Draft, Internet Engineering Task Force, Nov. 2001.
F. LeFaucheur, et al. "Requirements for Support of Diff-Serv-aware MPLS Traffic Engineering," Internet Draft, Internet Engineering Task Force, Nov. 2001.
Charny et al., U.S. Appl. No. 10/080,953, filed Feb. 22, 2002, "Linear Program-Based Technique for Placing FRR Te Tunnels With Bandwidth Guarantee".
Charny et al., U.S. Appl. No. 10/038,259, filed Jan. 2, 2002, "Implicit Shared Bandwidth Protection for Fast Reroute".
Charny et al., U.S. Appl. No. 10/052,665, filed Jan. 17, 2002, "Load Balancing For Fast Reroute Backup Tunnels".

* cited by examiner

*Primary Examiner*—Derrick W. Ferris
(74) *Attorney, Agent, or Firm*—Cindy Kaplan

(57) ABSTRACT

Fast Reroute capability is added to an IP network to guarantee fast recovery to IP traffic in case of link or node failure without the need to deploy a full mesh of MPLS Traffic Engineering Label Switched Paths (LSPs). In one implementation, to protect a link, a 1-hop primary LSP is configured for the protected link and in addition a backup tunnel is configured to protect the 1-hop primary LSP. To protect a node, 2-hop primary LSPs are established for the link pairs traversing the node and backup tunnel(s) are configured to protect these 2-hop primary LSPs.

28 Claims, 5 Drawing Sheets

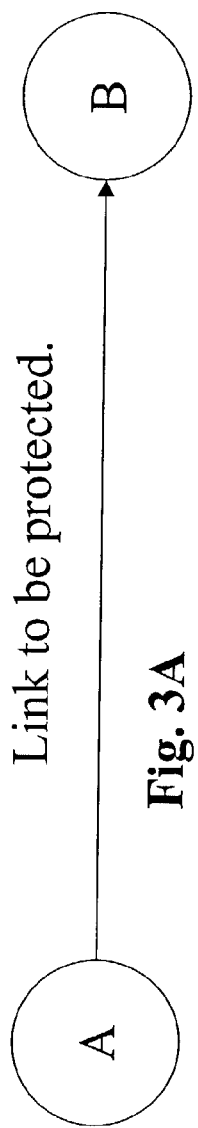
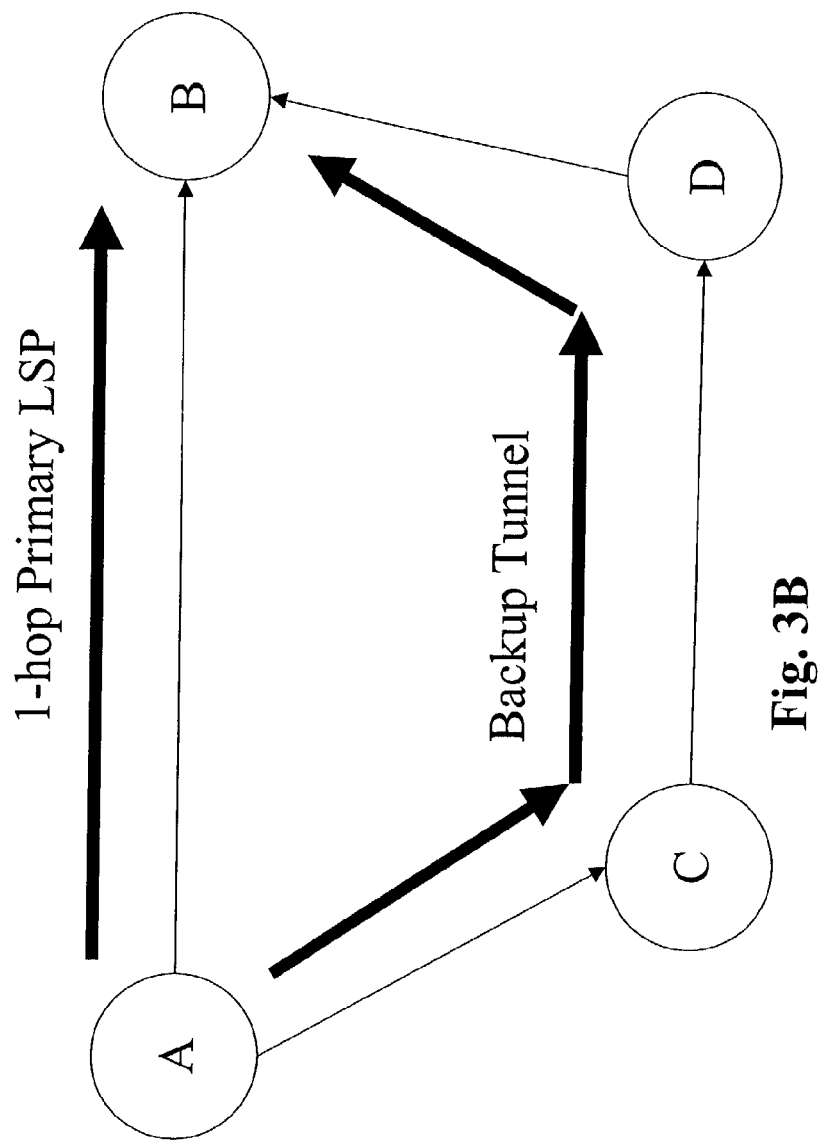
Fig. 3A
Fig. 3B

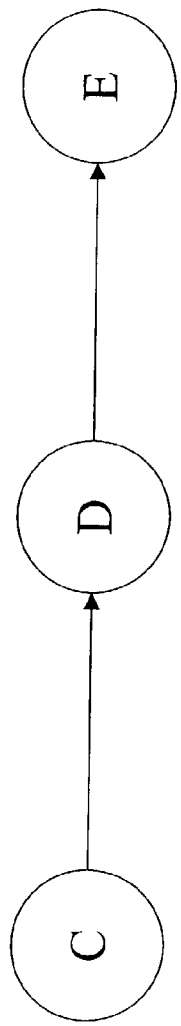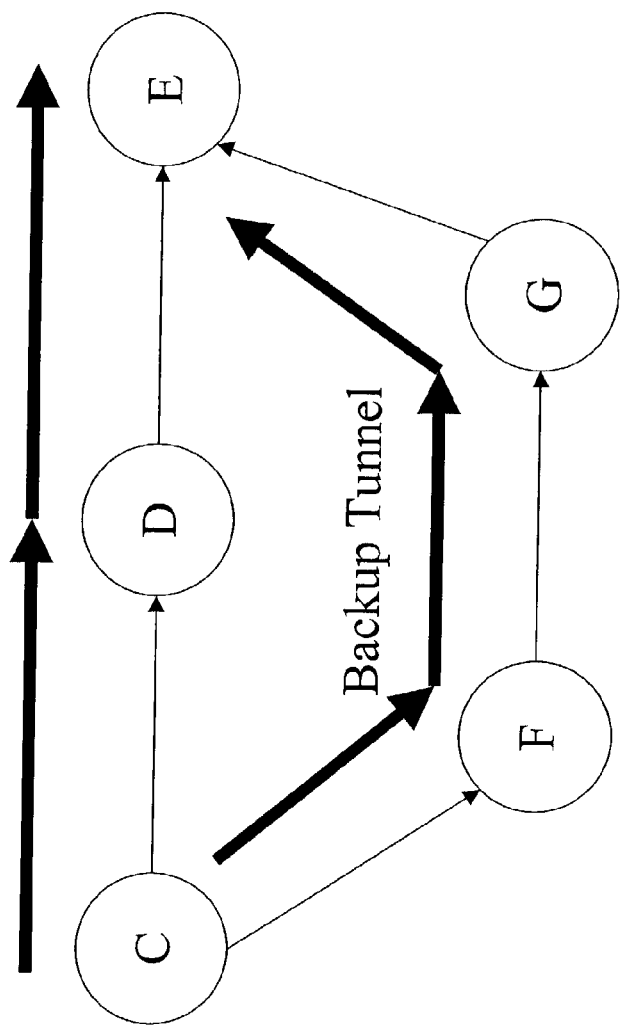
Fig. 4A
2-hop Primary LSP
Node D is to be protected.
Fig. 4B

MPLS FAST REROUTE WITHOUT FULL MESH TRAFFIC ENGINEERING

STATEMENT OF RELATED APPLICATIONS

The present application is related to the subject matter of U.S. patent application Ser. No. 10/052,665, entitled "Load Balancing for Fast Reroute Tunnels," filed on Jan. 17, 2002, the contents of which are herein incorporated by reference in their entirety for all purposes.

BACKGROUND OF THE INVENTION

The present invention relates to data networking and more particularly to systems and methods for providing fault tolerance to data networks.

The Internet and IP networks in general have become key enablers to a broad range of business, government, and personal activities. More and more, the Internet being relied upon as a general information appliance, business communication tool, entertainment source, and as a substitute for traditional telephone networks and broadcast media. As the Internet expands its role, users become more and more dependent on uninterrupted access.

To assure rapid recovery in the event of failure of a network link or node, so-called "Fast Reroute" techniques have been developed. In a network employing Fast Reroute, traffic flowing through a failed link or node is rerouted through one or more preconfigured backup tunnels. Redirection of the impacted traffic occurs very quickly to minimize impact on the user experience, typically in tens of milliseconds.

Fast Reroute, however, has been developed primarily for use in networks that employ MPLS (MultiProtocol Label Switching) Traffic Engineering. Rather than using conventional IP routing techniques where individual packets travel through the network following paths determined individually for each packet as it progresses through the network, MPLS Traffic Engineering exploits modern label switching techniques to build guaranteed bandwidth end-to-end circuits through a network of label switched routers (LSRs). MPLS Traffic Engineering networks are very useful to service providers who want to better utilize their network resources and provide quality of service guarantees to their customers. Such networks may be augmented with Fast Reroute capability by configuring backup tunnels in the form of LSPs in order to guarantee very fast traffic recovery in case of link or node failures. Depending on the particular variant of Fast Reroute employed, backup tunnels may be preconfigured for individual links or nodes, or for entire primary LSPs. Guaranteed backup protection may be provided by configuring the backup tunnels with guaranteed bandwidth. The configured backup tunnel bandwidth dictates the quality of service level of the rerouted Traffic Engineering LSPs during failures prior to reoptimization.

A problem arises in that Fast Reroute capability is highly desirable even in networks where MPLS Traffic Engineering has not been implemented. Fast Reroute capability may be required in an environment where the quality of service features provided by MPLS Traffic Engineering are not required. This is often the case for networks operating within an enterprise. What is needed are systems and methods for providing Fast Reroute capability to IP networks that do not employ MPLS Traffic Engineering end-to-end circuits.

SUMMARY OF THE INVENTION

By virtue of one embodiment of the present invention, Fast Reroute capability is added to an IP network to guarantee fast recovery to IP traffic in case of link or node failure without the need to deploy a full mesh of MPLS Traffic Engineering Label Switched Paths (LSPs). In one implementation, to protect a link, a 1-hop primary LSP is configured for the protected link and in addition a backup tunnel is configured to protect the 1-hop primary LSP. To protect a node, 2-hop primary LSPs are established for the link pairs traversing the node and backup tunnel(s) are configured to protect these 2-hop primary LSPs.

One aspect of the present invention provides a method for providing fast reroute protection to a plurality of links in an IP network. The method includes: for each of the links, configuring a 1-hop primary label switched path (LSP) spanning the link and assigning one or more backup tunnels to each 1-hop primary LSP for substitution upon detection of a link failure.

Further understanding of the nature and advantages of the inventions herein may be realized by reference to the remaining portions of the specification and the attached drawings.

BRIEF DESCRIPTION OF THE DRAWINGS

FIGS. 3A–3B depict Fast Reroute protection of a link according to one embodiment of the present invention.

FIGS. 4A–4B depict Fast Reroute protection of a node according to one embodiment of the present invention.

DESCRIPTION OF SPECIFIC EMBODIMENTS

Figure 2:
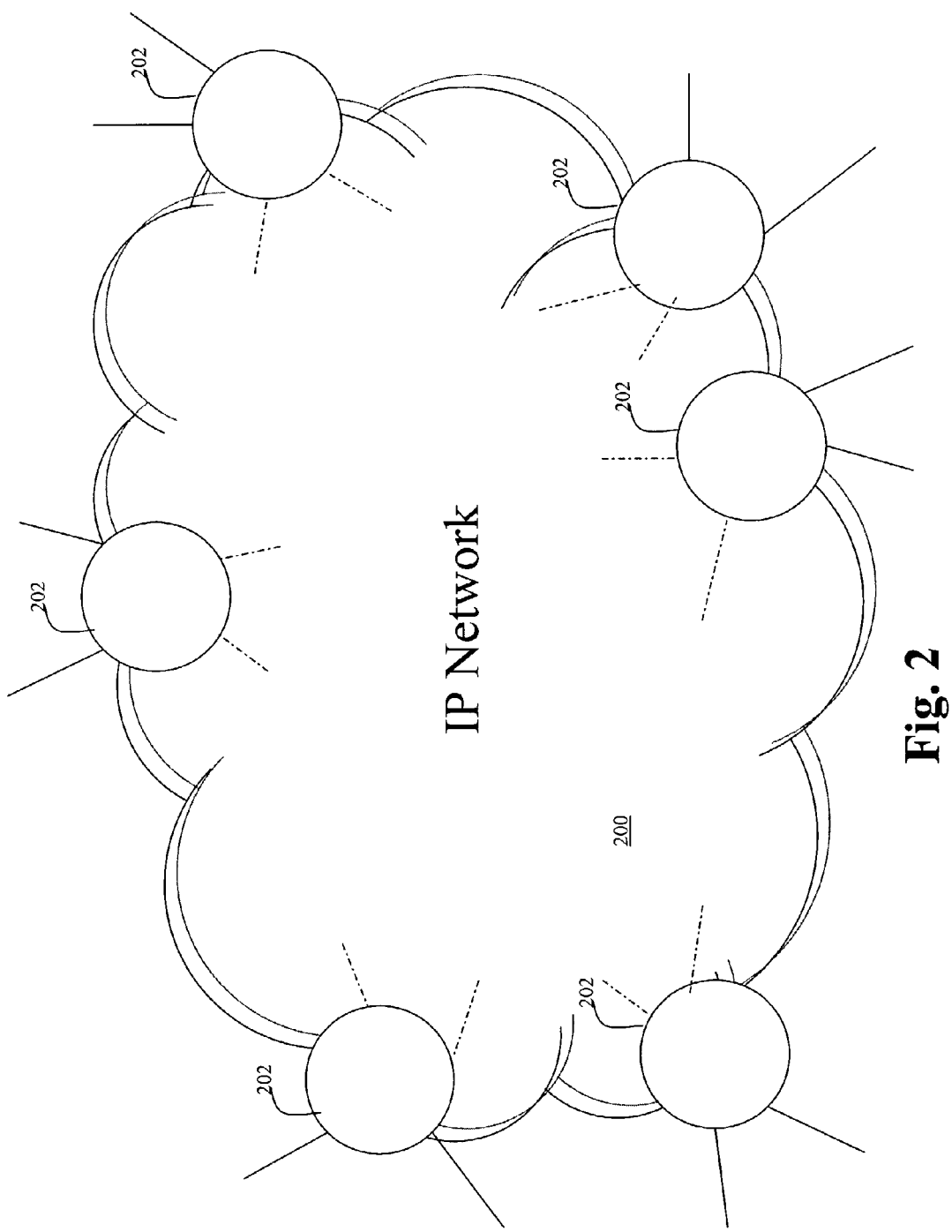
FIG. 2 depicts an IP network suitable for implementing one embodiment of the present invention.

The present invention will be described with reference to a representative network environment that uses a particular combination of protocols to move data through the network. FIG. 2 depicts a representative network 200. Edge nodes 202 of network 200 are depicted and couple to other nodes (not shown) outside network 200. Core nodes (also not shown) within network 200 provide interconnections between the edge nodes. Links between the various nodes may be implemented using any type of physical medium such as e.g., an optical medium, a wireless medium, twisted pair, etc.

In one embodiment, the nodes of network 200 interoperate in a manner specified by various protocols including, e.g., TCP/IP as known in the art, suitable link layer protocols such as Link Management Protocol (LMP), and protocols defined by the following documents:

E. Rosen, et al., "Multiprotocol Label Switching Architecture," RFC 3031, Internet Engineering Task Force, January 2001.

Braden, et al. "Resource ReSerVation Protocol (RSVP)—Version 1 Functional Specification," RFC 2205, Internet Engineering Task Force, September 1997.

Awduche, et al., "Requirements for Traffic Engineering Over MPLS," RFC 2702, Internet Engineering Task Force, September 1999.

Ashwood-Smith, et al., "Generalized MPLS Signaling—RSVP-TE Extensions," Internet Draft, Internet Engineering Task Force, October 2001.

Pan, et al., "Fast Reroute Techniques in RSVP-TE," Internet Draft, Internet Engineering Task Force, October 2001.

The contents of the above documents are herein incorporated by reference in their entirety for all purposes.

Although MPLS traffic engineering concepts, as will be explained below, are used to provide Fast Reroute protection according to one embodiment of the present invention, network 200 is preferably not a "Traffic Engineering" network, i.e., traffic does not typically flow through network 200 by way of end-to-end tunnels having reserved bandwidth. Instead, in one embodiment, very short, e.g., 1-hop and 2-hop primary tunnels are configured. These very short primary tunnels are not created for the purpose of reserving bandwidth but rather because their operation leads automatically to the configuration of backup tunnels to protect the links and nodes of network 200.

In accordance with one embodiment of the present invention, Fast Reroute protection is provided for either a link or a node. FIG. 3A depicts a single link between nodes A and B. FIG. 3B depicts how link protection is provided to this single link. A 1-hop primary LSP is set up using MPLS Traffic Engineering. The LSP is configured as having zero bandwidth. To insure that this LSP actually follows the 1-hop direct route from A to B, preferably no constraints are imposed on the path the LSP takes. If there are multiple parallel links between A and B, each link will have its own 1-hop primary LSP.

Packets flowing through the 1-hop primary LSP will typically not be encapsulated with an MPLS label due to the operation of penultimate hop popping (PHP) wherein labels are omitted from the last hop of an LSP, which in this case is the only hop.

In response to the creation of the 1-hop primary LSP between nodes A and B, a backup tunnel is created. In FIG. 3B, the backup tunnel extends from node A to node B through nodes C and D. The backup tunnel should not include the protected link. The backup tunnel is also signaled with zero bandwidth using MPLS Traffic Engineering techniques. Upon a failure traffic switches from the protected link to the backup tunnel.

Although only one backup tunnel is shown, backup responsibilities may be shared among multiple backup tunnels. Or a single backup tunnel or group of parallel backup tunnels may be shared among multiple links in a shared risk link group (SRLG), i.e., a group of parallel links likely to fail in concert, e.g., links sharing the same physical cable. Details of associating m parallel links with n backup tunnels are described in U.S. patent application Ser. No. 10/052,665.

FIG. 4A depicts a node to be protected, node D and two adjacent nodes, C and E. According to one embodiment of the present invention, to protect a node a 2-hop primary LSP is set up through each link pair of links traversing the protected node. Here, for clarity, only a single link pair is shown, links CD and DE. FIG. 4B shows a 2-hop primary LSP that has been established through this link pair by employing MPLS Traffic Engineering techniques. Like the 1-hop primary LSP described with reference to link protection, the 2-hop primary LSP is preferably configured with zero bandwidth and with no routing constraints so that it will follow the 2-hop path.

The single link pair and single primary LSP are presented for ease of depiction. It will be appreciated that there may be numerous link pairs. For example, if there were a further link from node D to a node X, link DX, an additional 2-hop LSP would be established through nodes C, D, and X. Adding another link from a node Y to node D, link YD would cause the addition of 2 more primary hop LSPs, one through nodes Y, D, and E and one through nodes Y, D, and X.

For each 2-hop primary LSP a backup tunnel is established. In FIG. 4B, a single backup tunnel through nodes C, F, G, and E is shown. Backup responsibilities may also be divided among multiple backup tunnels. The backup tunnels are preferably configured with zero bandwidth and with no constraints on their routing other than that the protected link and node should not be included. Node protection covers both the link and the node.

Figure 5:
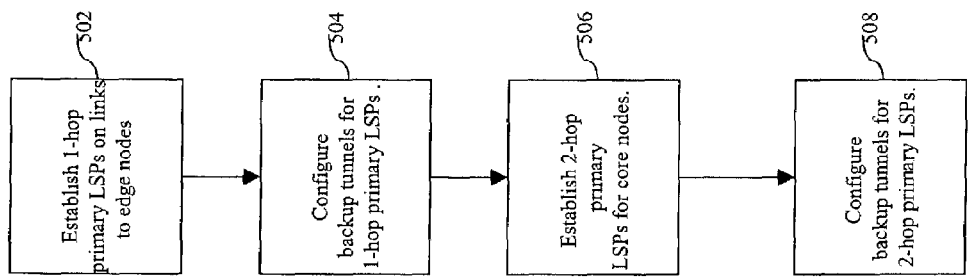
FIG. 5 is a flowchart describing steps of protecting an IP network according to one embodiment of the present invention.

FIG. 5 is a flowchart describing steps of providing backup protection to IP network 200 according to one embodiment of the present invention. Individual steps of FIG. 5 may be rearranged, deleted, supplemented, replaced, etc. within the scope of the present invention. At step 502, 1-hop primary LSPs are established on all the links to edge nodes of network 200.

At step 504, backup tunnels are set up for the 1-hop primary LSPs established in step 502, as shown in the example of FIGS. 3A–3B. At step 506, 2-hop primary LSPs are established for each core node of network 200, i.e., each node that is not an edge node. As was described with reference to FIG. 4B, for each node a 2-hop primary LSP is established for each link pair traversing the node. At step 508, backup tunnels are established to protect the 2-hop primary LSPs.

The result is overall protection of the network since each link traversed by traffic will now be part of either a protected 2-hop primary LSP or a protected 1-hop primary LSP. It will be appreciated that many links in the core will be a part of multiple 2-hop primary LSPs because of the many possible second-hop destinations. The particular 2-hop primary LSP taken will depend on the second-hop destination of the packet.

It is also possible to provide partial protection by protecting only certain nodes and links in the manner described with reference to FIGS. 3A–3B and FIGS. 4A–4B. Also, the computations to place primary LSPs and backup tunnels may be performed locally (either automatically or manually) at the protected nodes and at nodes connecting to the protected links. Alternatively, a management node may set up the primary LSPs and backup tunnels, either automatically or manually.

The backup tunnels are themselves LSPs that are patched in upon detection of a failure. A failure is detected, preferably within tens of ms. A link or node failure may be detected, e.g., at the link layer or by failure to receive an expected RSVP HELLO message (or by any other method). Once a failure of an element (link or node) is detected, traffic from each primary LSP traversing the failed element is redirected to the backup tunnels pre-established to protect the protected primary LSP. The detailed mechanics of patching in backup tunnels and reacting to the failure of protected elements are disclosed in the Internet Draft entitled "Fast Reroute Techniques in RSVP-TE."

Network 200 may also be an IP network where LSPs are used to carry end-to-end traffic albeit without the use MPLS Traffic Engineering bandwidth guarantees. For examples, the LSPs may have been established through the use of the well-known Label Distribution Protocol (LDP). In that case, the 1-hop and 2-hop primary LSPs that are established to provide backup protection are set up as second level LSPs, as known in the art.

Network Device Details

Figure 1:
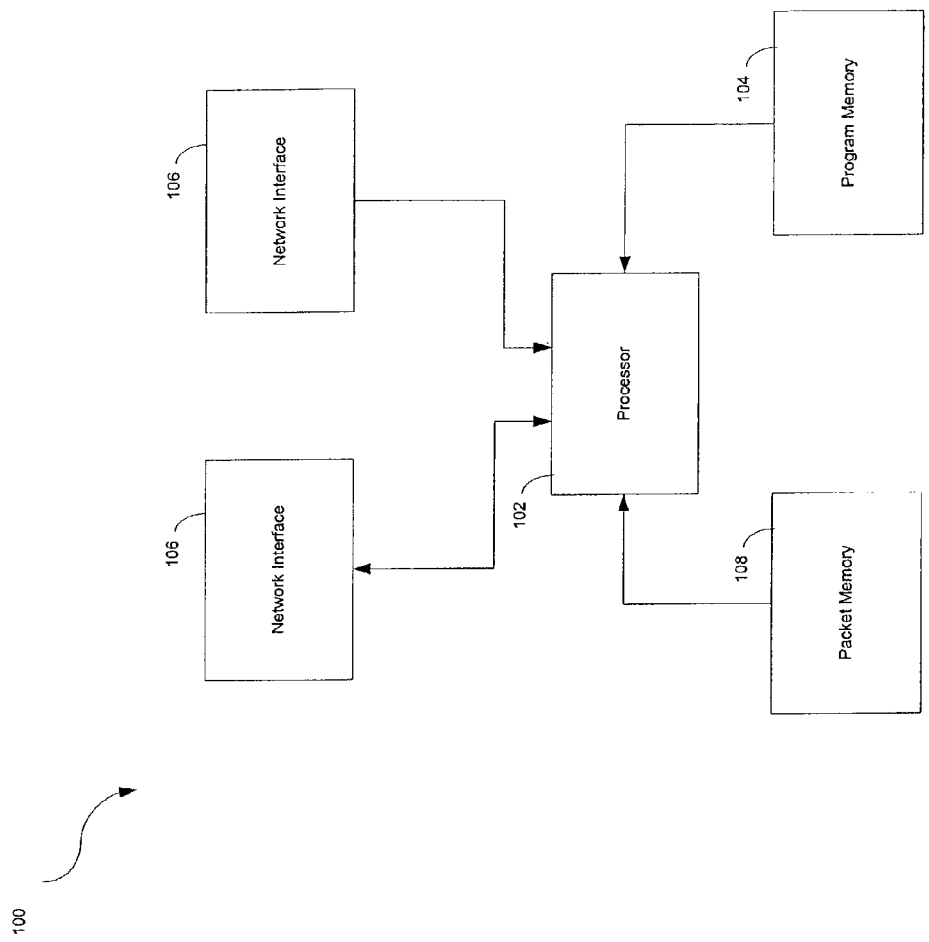
FIG. 1 depicts a network device according to one embodiment of the present invention.

FIG. 1 depicts a network device 100 that may be used to implement, e.g., any of the nodes depicted in FIGS. 2–4 or a network management workstation and/or perform any of the steps of FIG. 5. In one embodiment, network device 100 is a programmable machine that may be implemented in hardware, software or any combination thereof. A processor 102 executes code stored in a program memory 104. Program memory 104 is one example of a computer-readable storage medium. Program memory 104 can be a volatile memory. Another form of computer-readable storage medium storing the same codes would be some type of non-volatile storage such as floppy disks, CD-ROMs, DVD-ROMs, hard disks, flash memory, etc. A carrier wave that carries the code across a network is another example of a computer-readable storage medium.

Network device 100 interfaces with physical media via a plurality of network interfaces 106. For example, one of network interfaces 106 may couple to an optical fiber and may incorporate appropriate physical and link layer functionality. Other examples of network interfaces include Ethernet interfaces, DSL interfaces, Gigabit Ethernet interfaces, 10-Gigabit Ethernet interfaces, etc. As packets are received, processed, and forwarded by network device 100, they may be stored in a packet memory 108. Network device 100 implements all of the network protocols and extensions thereof described above as well as the data networking features provided by the present invention.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method for providing fast reroute protection to a plurality of links in an IP network, said method comprising:
   for each of said links, configuring a 1-hop primary label switched path (LSP) spanning the link and having zero bandwidth; and
   assigning one or more backup tunnels to each said 1-hop primary LSP for substitution upon detection of a link failure, wherein said one or more backup tunnels are configured without reserving bandwidth.

2. The method of claim 1 wherein communication through said IP network does not flow through end-to-end MPLS Traffic Engineering LSPs.

3. The method of claim 1 wherein at least some end-to-end communication through said IP network flows through one or more LSPs operated by use of Label Distribution Protocol.

4. The method of claim 1 wherein operation of said 1-hop primary label switched paths does not impose additional labels on packets as they traverse said IP network.

5. A method for providing fast reroute protection to a plurality of nodes in an IP network, said method comprising:
   for each node, configuring a 2-hop primary label switched path (LSP) to span each link pair traversing the node, said 2-hop primary LSP having zero bandwidth; and
   assigning one or more backup tunnels to each said 2-hop primary LSP for substitution upon detection of a link or node failure, wherein said one or more backup tunnels are configured without reserving bandwidth.

6. The method of claim 5 wherein communication through said IP network does not flow through end-to-end MPLS Traffic Engineering LSPs.

7. The method of claim 5 wherein at least some end-to-end communication through said IP network flows through one or more LSPs operated by use of Label Distribution Protocol.

8. Apparatus for providing fast reroute protection to a plurality of links in an IP network, said apparatus comprising:
   means for, for each of said links, configuring a 1-hop primary label switched path (LSP) spanning the link and having zero bandwidth; and
   means for assigning one or more backup tunnels to each said 1-hop primary LSP for substitution upon detection of a link failure, wherein said one or more backup tunnels are configured without reserving bandwidth.

9. The apparatus of claim 8 wherein communication through said IP network does not flow through end-to-end MPLS Traffic Engineering LSPs.

10. The apparatus of claim 8 wherein at least some end-to-end communication through said IP network flows through one or more LSPs operated by use of Label Distribution Protocol.

11. The apparatus of claim 8 wherein operation of said 1-hop primary label switched paths does not impose additional labels on packets as they traverse said IP network.

12. Apparatus for providing fast reroute protection to a plurality of nodes in an IP network, said apparatus comprising:
   means for, for each node, configuring a 2-hop primary label switched path (LSP) to span each link pair traversing the node, said 2-hop primary LSP having zero bandwidth; and
   means for assigning one or more backup tunnels to each said 2-hop primary LSP for substitution upon detection of a link or node failure, wherein said one or more backup tunnels are configured without reserving bandwidth.

13. The apparatus of claim 12 wherein communication through said IP network does not flow through end-to-end MPLS Traffic Engineering LSPs.

14. The apparatus of claim 12 wherein at least some end-to-end communication through said IP network flows through one or more LSPs operated by use of Label Distribution Protocol.

15. A computer program product for providing fast reroute protection to a plurality of links in an IP network, said computer program product comprising:
   code that, for each of said links, configures a 1-hop primary label switched path (LSP) spanning the link and having zero bandwidth;
   code that assigns one or more backup tunnels to each said 1-hop primary LSP for substitution upon detection of a link failure, wherein said one or more backup tunnels are configured without reserving bandwidth; and
   a computer-readable storage medium that stores the codes wherein the computer-readable storage medium comprises volatile or non-volatile storage.

16. The computer program product of claim 15 wherein communication through said IP network does not flow through end-to-end MPLS Traffic Engineering LSPs.

17. The computer program product of claim 15 wherein at least some end-to-end communication through said IP network flows through one or more LSPs operated by use of Label Distribution Protocol.

18. The computer program product of claim 15 wherein operation of said 1-hop primary label switched paths does not impose additional labels on packets as they traverse said IP network.

19. A computer program product for providing fast reroute protection to a plurality of nodes in an IP network, said computer program product comprising:
- code for, for each node, configuring a 2-hop primary label switched path (LSP) to span each link pair traversing the node, said 2-hop primary LSP having zero bandwidth;
- code for assigning one or more backup tunnels to each said 2-hop primary LSP for substitution upon detection of a link or node failure, wherein said one or more backup tunnels are configured without reserving bandwidth; and
- a computer-readable storage medium that stores the codes wherein the computer-readable storage medium comprises volatile or non-volatile storage.

20. The computer program product of claim 19 wherein communication through said IP network does not flow through end-to-end MPLS Traffic Engineering LSPs.

21. The computer program product of claim 19 wherein at least some end-to-end communication through said IP network flows through one or more LSPs operated by use of Label Distribution Protocol.

22. Apparatus for providing fast reroute protection to a plurality of links in an IP network, said apparatus comprising:
- a processor; and
- a memory device that stores instructions for execution by said processor, said memory device having stored thereon:
- code that, for each of said links, configures a 1-hop primary label switched path (LSP) spanning the link and having zero bandwidth; and
- code that assigns one or more backup tunnels to each said 1-hop primary LSP for substitution upon detection of a link failure, wherein said one or more backup tunnels are configured without reserving bandwidth.

23. The apparatus of claim 22 wherein communication through said IP network does not flow through end-to-end MPLS Traffic Engineering LSPs.

24. The apparatus of claim 22 wherein at least some end-to-end communication through said IP network flows through one or more LSPs operated by use of Label Distribution Protocol.

25. The computer program product of claim 22 wherein operation of said 1-hop primary label switched paths does not impose additional labels on packets as they traverse said IP network.

26. Apparatus for providing fast reroute protection to a plurality of nodes in an IP network, said apparatus comprising:
- a processor; and
- a memory device having instructions stored thereon for execution by said processor, said instructions comprising:
- code for, for each node, configuring a 2-hop primary label switched path (LSP) to span each link pair traversing the node, said 2-hop primary label switched path having zero bandwidth; and
- code for assigning one or more backup tunnels to each said 2-hop primary LSP for substitution upon detection of a link or node failure, wherein said one or more backup tunnels are configured without reserving bandwidth.

27. The apparatus of claim 26 wherein communication through said IP network does not flow through end-to-end MPLS Traffic Engineering LSPs.

28. The apparatus of claim 27 wherein at least some end-to-end communication through said IP network flows through one or more LSPs operated by use of Label Distribution Protocol.

* * * * *